United States Patent [19]

Nakabe et al.

[11] 3,708,613

[45] Jan. 2, 1973

[54] COLOR TELEVISION RECEIVER

[75] Inventors: Ryuhei Nakabe, Hirakata; Seiji Fujisawa, Abeno-ku, Osaka; Yasuhiro Sugihara, Kitakawachi-gun, Osaka; Norio Meki, Neyagawa, all of Japan

[73] Assignee: Matsushita Electric Industrial Co., Ltd., Osaka, Japan

[22] Filed: Oct. 9, 1970

[21] Appl. No.: 79,484

[30] Foreign Application Priority Data

Oct. 15, 1969 Japan ....................44/82835

[52] U.S. Cl. ....................178/5.4 HE

[51] Int. Cl. ....................H04n 9/12

[58] Field of Search ....................178/5.4, 5.4 HE, 5.4 AC

[56] References Cited

UNITED STATES PATENTS

| | | | |
|---|---|---|---|
| 3,525,802 | 8/1970 | Whiteneir, Jr. | 178/5.4 HE |
| 2,888,514 | 5/1959 | Pritchard | 178/5.4 HE |
| 3,141,064 | 7/1964 | Macovski | 178/5.4 AC |

*Primary Examiner*—Richard Murray
*Attorney*—Stevens, Davis, Miller & Mosher

[57] ABSTRACT

A color television receiver which receives color signals including a carrier chrominance signal; wherein a portion with a specified phase angle and phase width is picked up from said carrier chrominance signal and the amplitude of said portion of the carrier chrominance signal is utilized to automatically control the color saturation level, thereby producing a more natural color image.

8 Claims, 24 Drawing Figures

R. NAKABE,
S. FUJISAWA,
Y. SUGIHARA
AND N. MIEKI
INVENTORS

BY Stevens, Davis, Miller & Mosher
ATTORNEYS

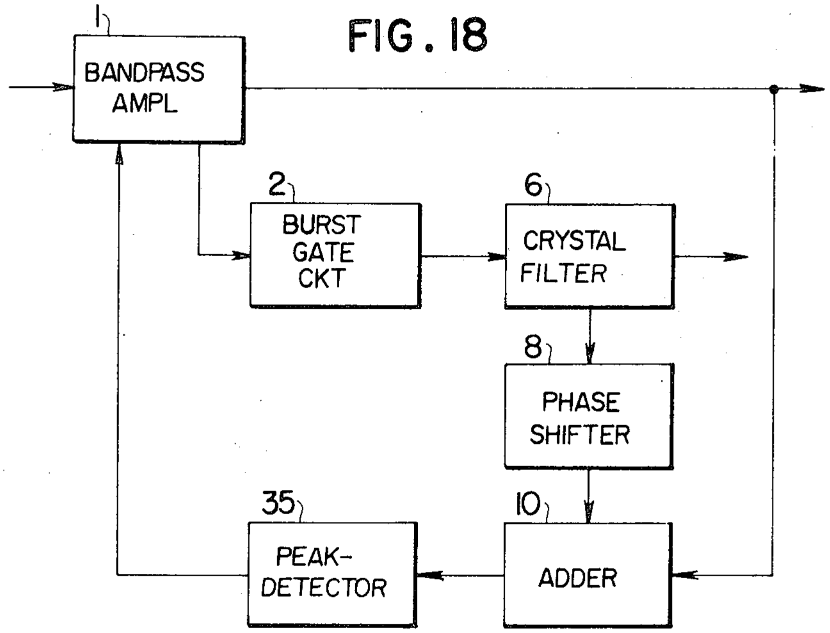
FIG. 18
FIG. 19b
FIG. 19a
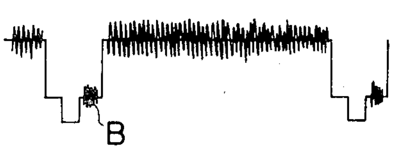
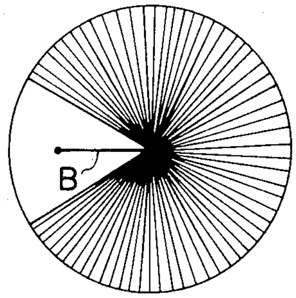

COLOR TELEVISION RECEIVER

The present invention relates to an automatic saturation-controlling device for a color television receiver such as an NTSC type, which receives color components on different carriers.

An object of the present invention is to provide a device for regenerating a more natural color image through an automatic control of color saturation by utilizing the amplitude of a color chrominance signal of a specified phase.

Another object of the present invention is to provide a simple and economical device to realize the above-mentioned first object.

The above and other objects, features and advantages will be made apparent by the detailed description taken in conjunction with the accompanying drawings, in which.

Figure 3:
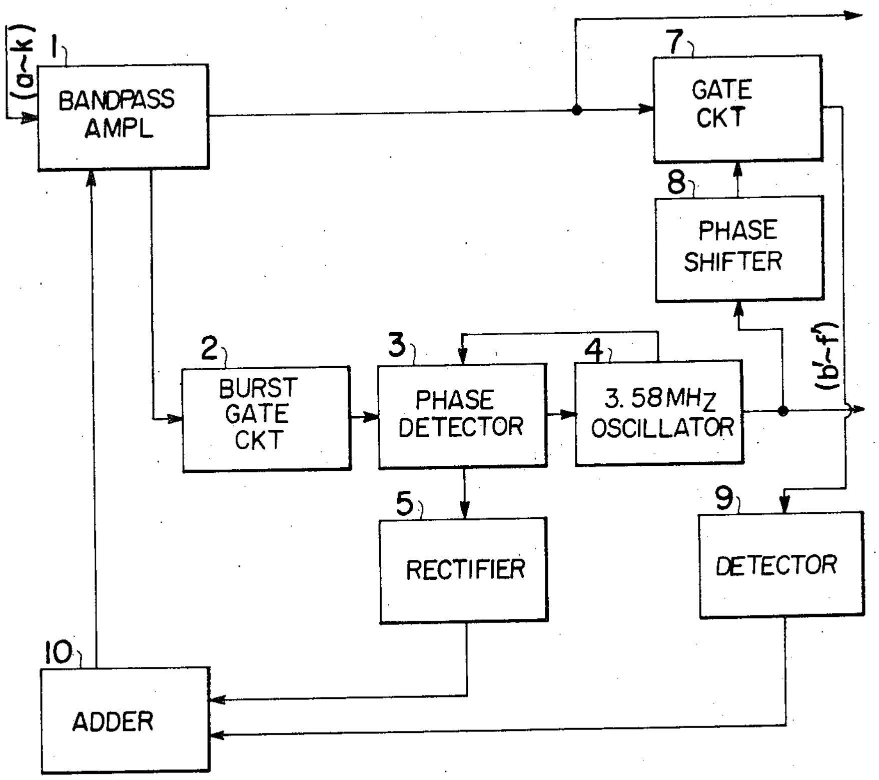
FIG. 3 shows a block diagram of a color television receiver incorporating an embodiment of the present invention.
Figure 6:
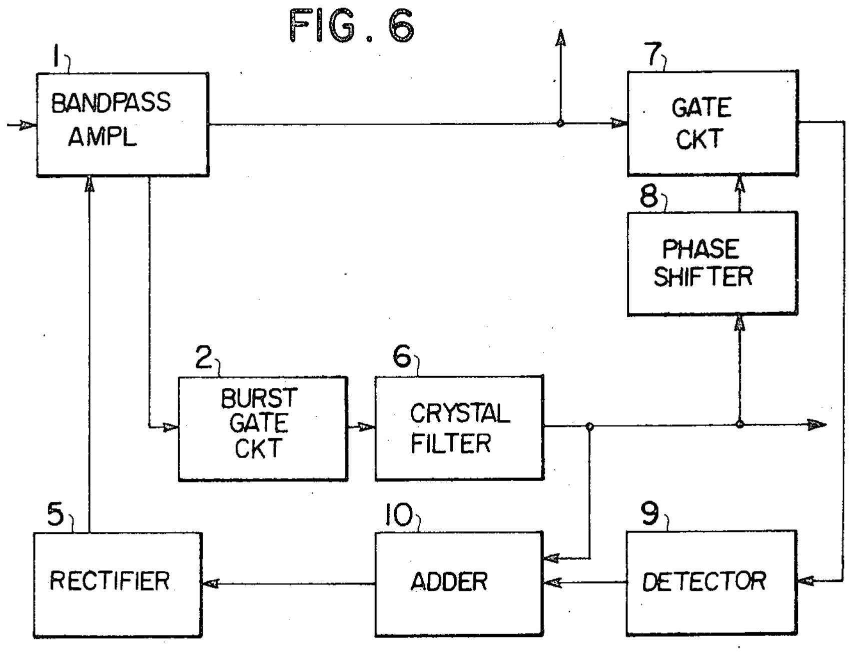
Figure 7:
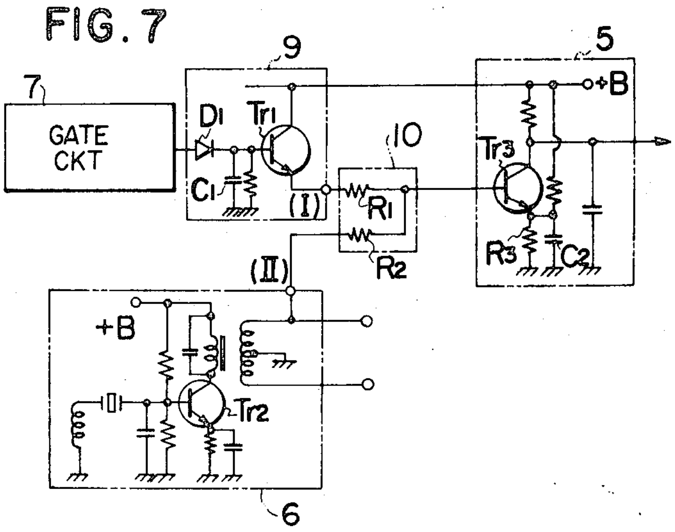
Figure 8:
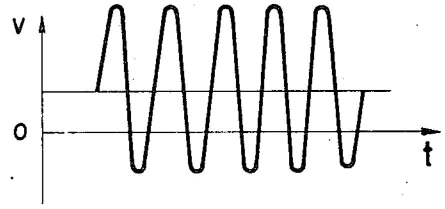
Figure 9:
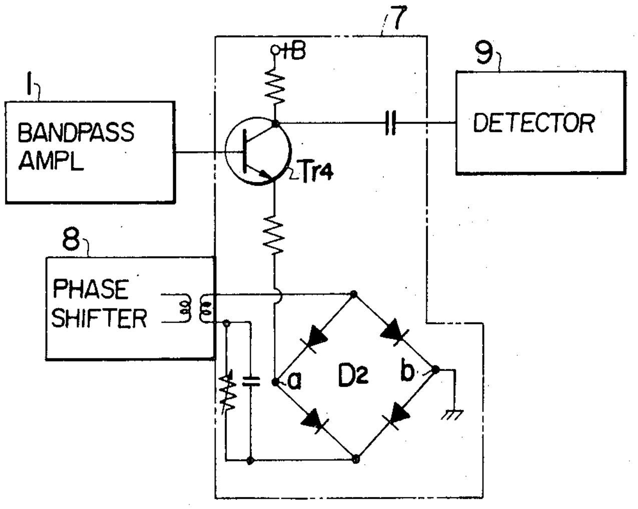
Figure 10:
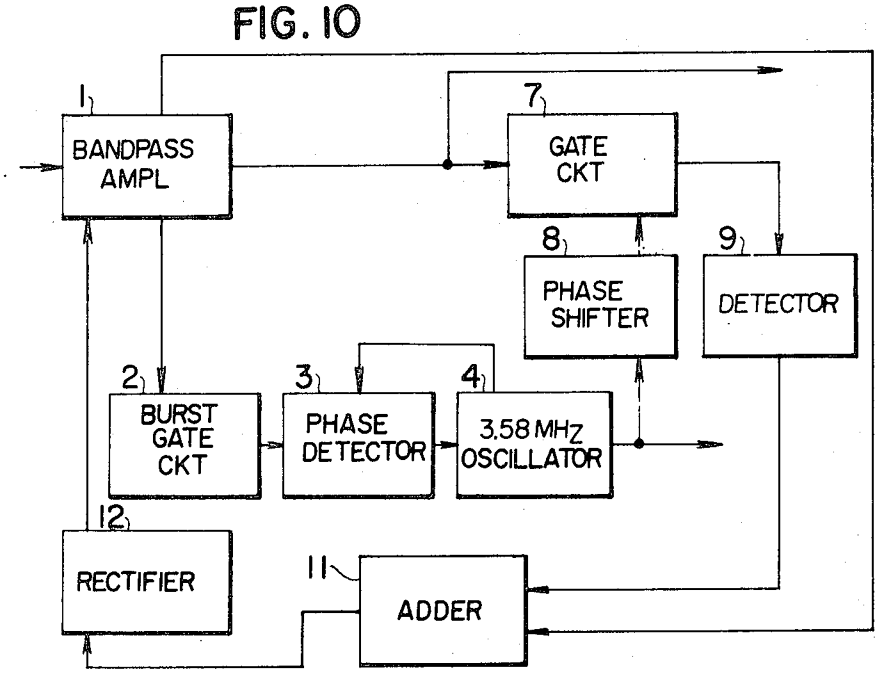
Figure 11:
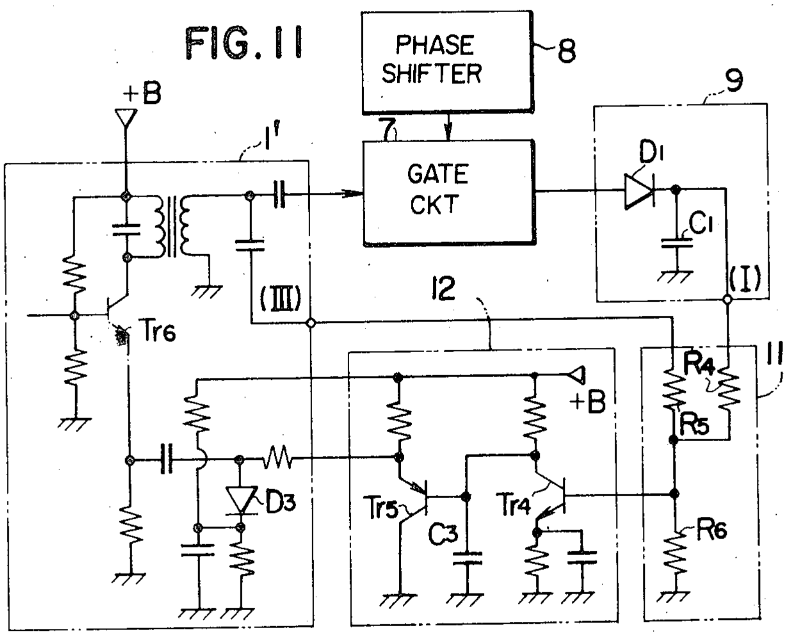
Figure 12:
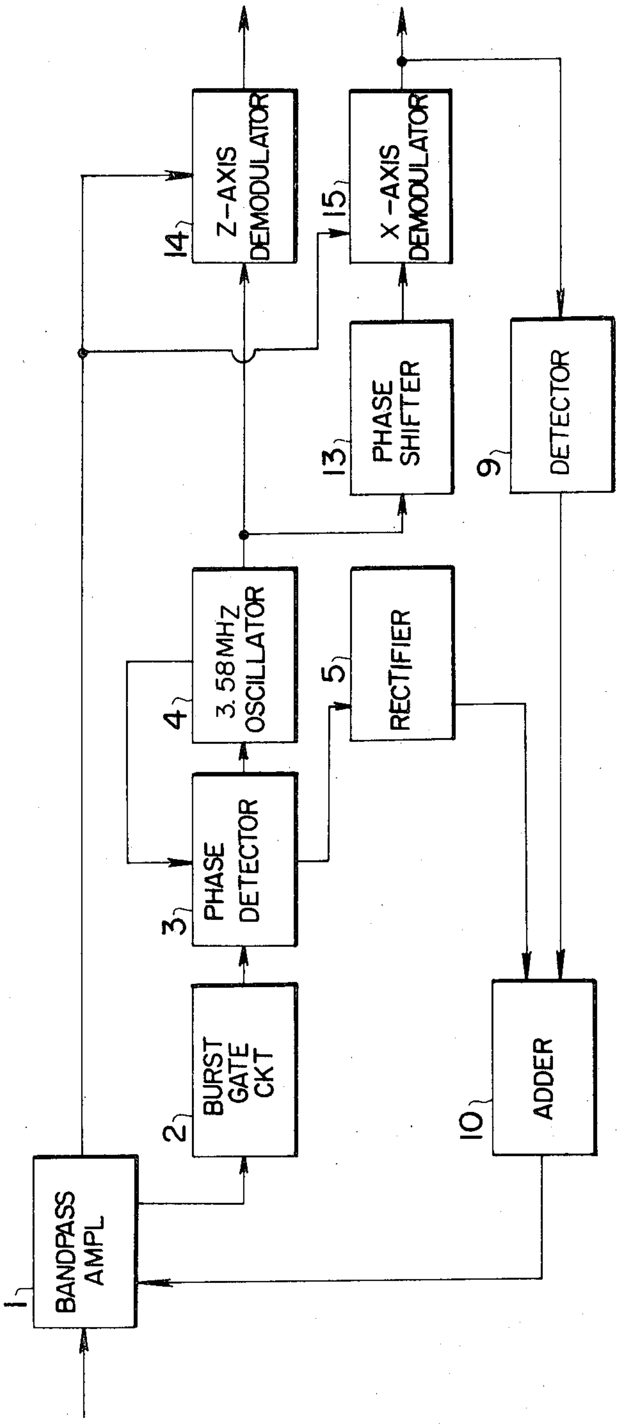
Figures 13, 14:
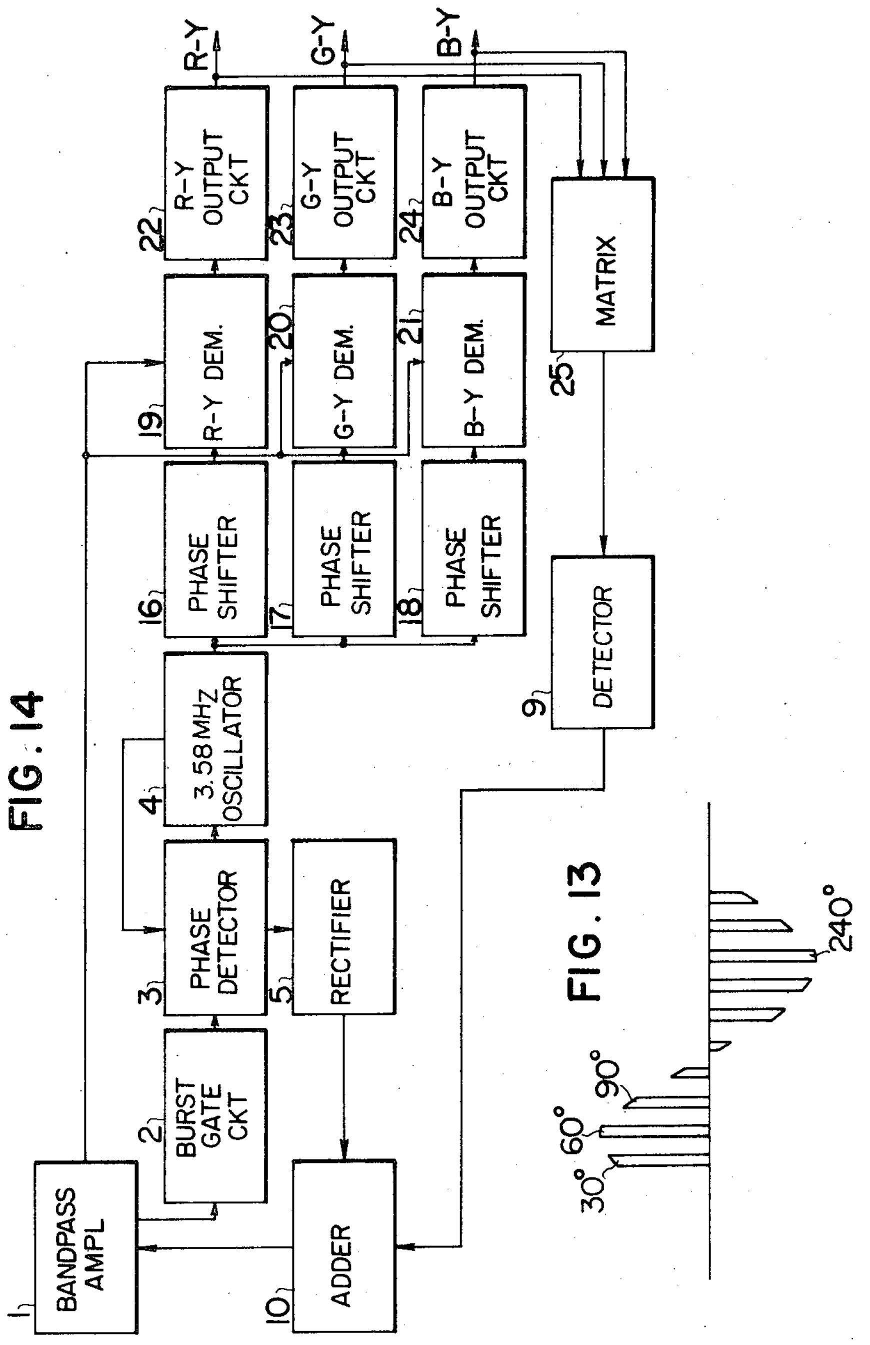
Figures 15, 16, 17:
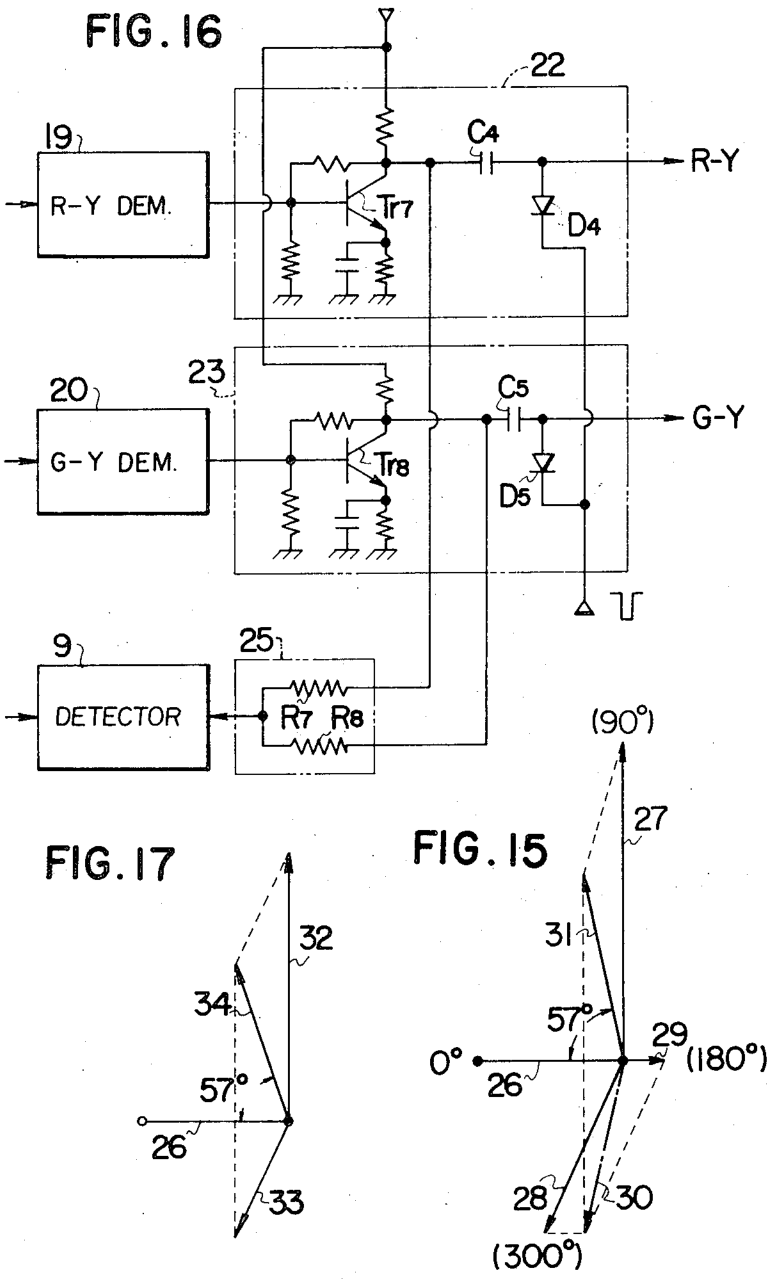
Figure 21:
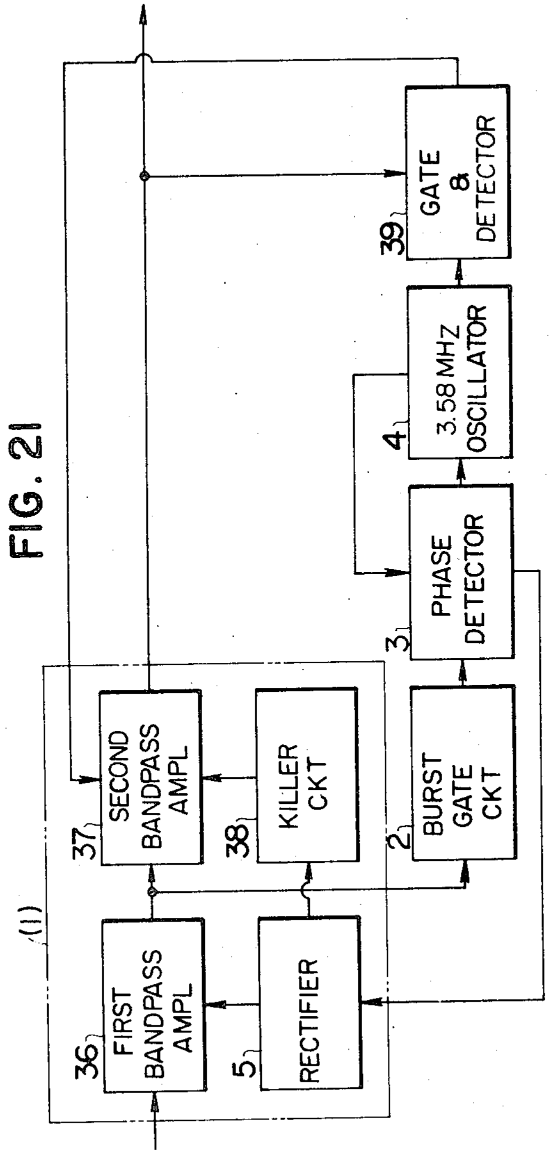
Figure 20:
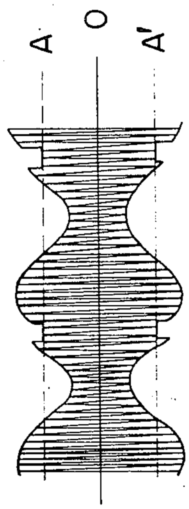

FIGS. 4*a*, 4*b*, 5*a* and 5*b* show waveforms and vectors for explaining the color television receiver as shown in FIG. 3;

FIG. 6 shows a block diagram of a color television receiver including another embodiment of the present invention;

FIG. 7 is a detailed diagram of the circuit as shown in FIG. 6;

FIG. 8 shows a waveform for explaining FIG. 7;

FIG. 9 is a detailed diagram showing the essential components of the circuit as shown in FIG. 3;

FIG. 10 shows a block diagram of a color television receiver including still another embodiment of the present invention;

FIG. 11 illustrates a detailed circuit diagram of the device according to the invention as shown in FIG. 10;

FIG. 12 shows a block diagram of a color television receiver including still another embodiment of the present invention;

FIG. 13 shows a waveform for explaining the embodiment as shown in FIG. 12;

FIG. 14 shows a block diagram of a color television receiver including still another embodiment of the present invention;

FIG. 15 is a diagram showing vectors for explaining the embodiment of FIG. 14;

FIG. 16 illustrates a detailed circuit diagram of the embodiment shown in FIG. 14;

FIG. 17 is a diagram showing vectors for explaining the detailed circuit diagram of FIG. 16;

FIG. 18 shows a block diagram of a color television including still another embodiment of the invention;

FIGS. 19*a*, 19*b* and 20 show waveforms and vectors for explaining the color television receiver as shown in FIG. 18; and FIG. 21 is a block diagram showing an example of a means for controlling the gain of a bandpass amplifier included in the above-mentioned embodiments.

Figure 1:
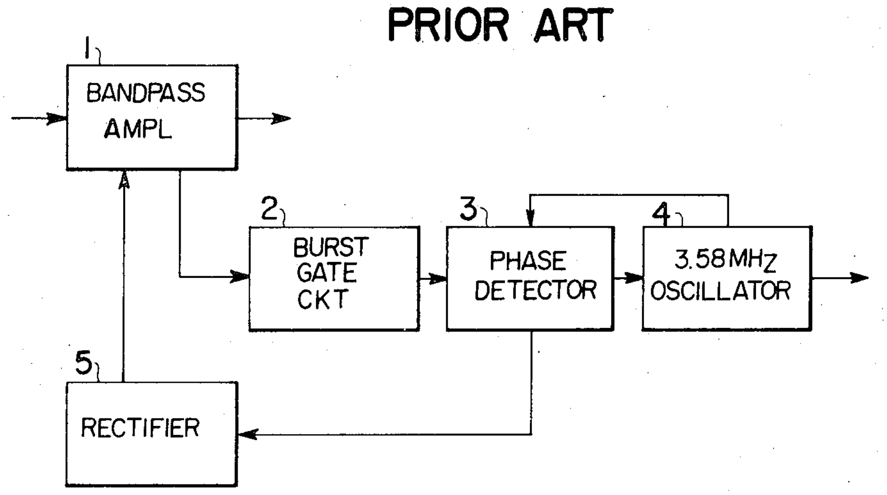
FIG. 1 PRIOR ART
FIGS. 1 and 2 show a block diagram of a conventional color television receiver.

An automatic color saturation control circuit employing an APC-type color synchronizing circuit for an ordinary color television receiver is shown in FIG. 1. Similarly, an automatic color saturation control circuit employing a crystal filter type color synchronizing circuit for a conventional color television is shown in FIG. 2.

The operation of the circuit as shown in FIG. 1 will be explained briefly below. Numeral 1 shows a bandpass amplifier, the output signal of which is partly applied to the burst gate circuit 2. Only the burst components are picked up by the burst gate circuit 2 and applied to the phase detector 3, to which a part of the output of the 3.58 MHz oscillator 4 is fed back for phase detection and the resulting output of the phase detector 3 is again applied to the 3.58 MHz oscillator 4 to control the oscillation frequency and phase thereof. Also, part of the output of the phase detector 3 is rectified by the rectifier circuit 5 and the resulting output is fed back to the bandpass amplifier 1 for automatic gain control.

Figure 2:
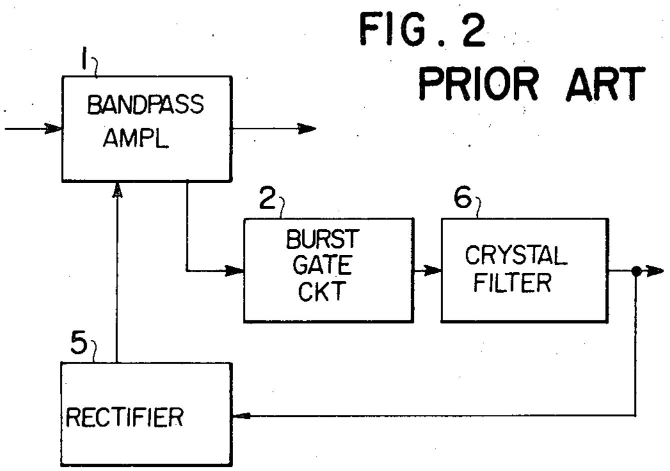
FIG. 2 PRIOR ART

Referring to FIG. 2, numerals 1 and 2 show a bandpass amplifier and a burst gate circuit respectively with quite the same functions as those of the similar circuits shown in FIG. 1. Numeral 6 shows a crystal filter circuit, to which a burst signal from the burst gate circuit 2 is applied. In this way, 3.58 MHz continuous wave in synchronism with the burst signal can be obtained. Numeral 5 shows a rectifier circuit which rectifies the 3.58 MHz continuous wave and whose output is fed back to the bandpass amplifier 1 for automatic gain control. The conventional device of the above-mentioned constructions is theoretically adequate for the purpose of automatic control. Actually, however, since the ratio of chrominance signal amplitude to burst amplitude somewhat varies from one broadcasting station to another or the amplitude of a carrier chrominance signal is distorted in a receiver (DG-differential gain), the chrominance amplitude among different broadcasting stations varies. Therefore the conventional device has the disadvantage that an inferior televised picture is reproduced.

The present invention is aimed at obviating these disadvantages and will be explained below with reference to embodiments. The construction of an embodiment of the invention is illustrated in FIG. 3, in which the circuits with numerals 1 to 5 function in quite the same way as those shown by the same numerals in FIG. 1. Numeral 7 shows a gate circuit which picks up a carrier chrominance signal with a desired phase angle out of the output of bandpass amplifier 1. Numeral 8 shows a phase shifter which phase-shifts the 3.58 MHz continuous wave of the 3.58 MHz oscillator 4 for determining the above-mentioned chrominance signal of a desired phase angle. Numeral 9 shows a detector for peak-detection. Numeral 10 shows an adder which adds in a certain proportion that part of the output of the phase detector 3 which is rectified by the rectifier circuit 5, and the output signal of the gate circuit 7 which is peak-detected by the detector 9.

Figure 4A:
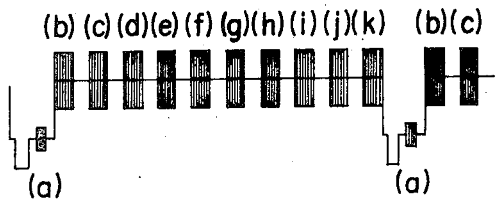
Figure 4B:
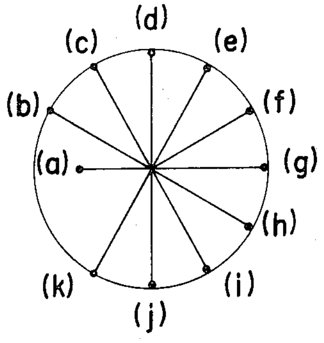

Assume now that a carrier chrominance signal with a constant amplitude and a waveform as shown in FIG. 4*a*, which alternates up to 300° at an interval of 30° in every cycle with a burst signal a as a reference, is applied to the bandpass amplifier 1. Then the bandpass amplifier 1 produces a signal from which the burst signal *a* is erased. On the other hand, the other part of the output of the bandpass amplifier 1 is applied to the burst gate circuit 2, phase detector 3 and 3.58 MHz oscillator 4 and as a result, 3.58 MHz continuous wave in synchronism with the burst signal is obtained as the output of the 3.58 MHz oscillator 4.

Figure 5A:
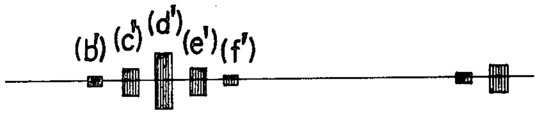
Figure 5B:
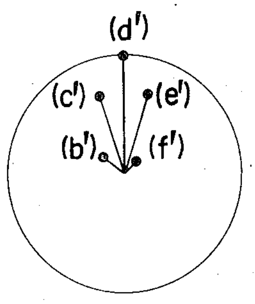

Assume here again that the 3.58 MHz continuous wave is phase-shifted by the phase shifter 8 in such a manner as to render the amplitude of signal *d* the largest in the output of the gate circuit 7. Then a waveform as shown in FIG. 5*a* and vectors as shown in FIG. 5*b* are obtained. As can be seen from the figures, signals *b* and *c* have a smaller amplitude than signal *d*. Therefore, when these signals are peak-detected by the detector 9, the resulting detected voltage is determined by signal *d*. This detected voltage and that part of the output of phase detector 3 which is rectified by the rectifier circuit 5 are added to each other in a certain proportion and the resulting output is fed back to the bandpass amplifier 1, thereby to accomplish an automatic control of the color saturation. As mentioned above, the gain of the gate circuit 7 is largest in signal *d* and hence the degree of automatic control largely depends on the amplitudes of hues in the neighborhood of signal *d*, the other hues contributing less to the automatic control. Accordingly, it is possible to accomplish automatic control in accordance with the degree of saturation of a carrier chrominance signal corresponding to a specified hue.

FIG. 6 shows another embodiment as applied to the filter-type color synchronizing circuit as shown in FIG. 2. The circuits shown by numerals 1, 2, 6 and 5 perform exactly the same functions as those circuits with the same numerals in FIG. 2. Also, the circuits 7 and 8 function in the same way as the gate circuit 7 and the phase shifter 8 respectively shown in FIG. 3. Numeral 9 shows a detector for peak-detecting the output of the gate circuit 7, and numeral 10 an adder.

Suppose that the signals as shown in FIG. 4 are applied to the bandpass amplifier 1. Then it is obvious from the foregoing description that signals as shown in FIG. 5 are obtained as the output of the gate circuit 7. These signals are peak-detected by the detector 9 and applied to the adder 10, where they are added to 3.58 MHz continuous wave from the crystal filter circuit 6. The resulting output of the adder 10 is rectified by the rectifier circuit 5 and fed back to the bandpass amplifier 1, thereby to achieve automatic control of the color saturation.

Referring now to FIG. 7, the operation of this embodiment will be explained below. A d-c voltage proportional to the amplitude of the carrier chrominance signal which appears at the emitter (the point shown by I) of transistor $Tr_1$ and 3.58 MHz continuous wave proportional to the amplitude of a burst signal which appears at the secondary (the point shown by II) of a demodulating transformer connected with the collector of transistor $Tr_2$ are supplied through the resistors $R_1$ and $R_2$ respectively to the base of the adding transistor $Tr_3$. FIG. 8 illustrates the base waveform of transistor $Tr_3$ which is biased for class AB energization. Thus rectification is accomplished between the base and emitter of transistor $Tr_3$ and therefore the gain of the bandpass amplifier is controlled by the amplification of the transistor $Tr_3$. Incidentally the voltages across the resistor $R_3$ and capacitor $C_2$ function as a reference voltage. Also the gain of the bandpass amplifier is controlled through the amplification by the transistor $Tr_3$. The detail of the gate circuit 7 is shown in FIG. 9, in which a signal from the phase shifter 8 is applied to the diode $D_2$ of the gate circuit 7, thereby to conduct the diode $D_2$ during the positive period of the phase-shifted 3.58 MHz continuous wave. Conduction of diode $D_2$ causes the same potential at points *a* and *b*, when the transistor $Tr_4$ is energized to produce a signal at its collector.

A television viewer is generally critical about the flesh tint of an image on the screen. For this reason, it is suggested that, in the embodiments shown in FIGS. 3 and 6, the phase of the output signal of the 3.58 MHz oscillator 4 applied to the gate circuit 7 is delayed by 57° with respect to the burst signal by the phase shifter 8. Then a carrier chrominance signal representing the flesh tint is obtained as the output of gate circuit 7 from among the output of the bandpass amplifier 1, and therefore a higher degree of automatic control is achieved in obtaining the flesh tint than in obtaining the other hues. This makes it easier to accomplish natural color saturation on a televised picture.

Another embodiment of the present invention is shown in FIG. 10, in which the circuits shown by the numerals 1, 2, 3, 4, 7, 8 and 9 function exactly the same way as the circuits of the same numerals in FIG. 3. A carrier chrominance signal of a desired phase angle picked up from the gate circuit 7 and peak-detected by the detector 9 is added to part of the carrier chrominance signal from the bandpass amplifier 1 at the adder 11 and then rectified by the rectifier circuit 12. The resulting signal is used to control the gain of the bandpass amplifier 1 for the eventual control of color saturation. An actual example of the device according to the present invention as embodied in FIG. 10 is shown in FIG. 11. The circuit 1' consists of a part of the bandpass amplifier 1, diode $D_3$ which is a gain control element, etc. A chrominance signal output of the circuit 1' is applied through the gate circuit 7 to the detector 9, and a d-c voltage proportional to the amplitude of a carrier chrominance signal of a desired phase angle among the outputs of the detector 9 is obtained at point I, in the same way as described above with reference to FIGS. 7 and 9. The output I of the detector 9 is added to the output III of the circuit 1' by the adder 11 consisting of resistors $R_4$, $R_5$ and $R_6$ and applied to the base of transistor $Tr_4$. The carrier chrominance signal passing through the resistor $R_5$ is rectified between the base and emitter of the transistor $Tr_4$, amplified by the transistor $Tr_4$ and smoothed by the capacitor $C_3$, thereby to obtain a d-c voltage proportional to the signals at points I and III. This d-c voltage is applied to the base of transistor $Tr_5$ to vary the current in the diode $D_3$, thereby controlling the amplitude of transistor $Tr_6$ and eventually the gain of the carrier chrominance signal. Incidentally, the transistor $Tr_5$ functions as an emitter follower for impedance conversion.

By controlling the color saturation in the way mentioned above, the following effects are obtained:

When setting the phase shifter 8 in such a manner as to pick up from the gate circuit 7 only those carrier chrominance signals corresponding to or near the flesh tint, namely, a signal 57° delayed in phase with respect to a burst signal, assuming that the gain of the bandpass amplifier 1 is controlled only by the signal picked up from the gate circuit 7. Then, if a carrier chrominance signal only out of phase, for example, by ±90° with respect to the flesh tint signal is applied to the bandpass amplifier 1, no output signal appears at the gate circuit 7 and hence the gain of the bandpass amplifier 1 becomes maximum. This increases the color saturation extremely, resulting in an ugly color image being reproduced on the screen. If carrier chrominance signals without any signal corresponding to or near the flesh tint arrive, the controlling of the gain of bandpass amplifier 1 by adding a part of the carrier chrominance signals to the output signal of the gate circuit 7 enables a natural color image to be obtained.

In the embodiments of FIGS. 3, 6 and 10, 3.58 MHz continuous wave shifted to a specified phase has been used to obtain from the gate circuit 7 a carrier chrominance signal of a specified phase among the carrier chrominance signals of the bandpass amplifier 1. However, this can be replaced by a method which was pulses which coincide in timing with the one with a specified phase angle and phase width among the carrier chrominance signals. Such pulses can be obtained in the following way: the output of the bandpass amplifier is passed through a limiter so as to maintain a constant amplitude of such an output, while on the other hand the 3.58 MHz continuous wave is shifted to a desired phase, and both of the resulting outputs are phase-detected. In this way, a waveform can be obtained which has such an amplitude characteristic that the amplitude of the phase-detected output is maximum when a carrier chrominance signal is in phase with the phase-shifted 3.58 MHz continuous wave and that the amplitude is sinusoidally more attenuated as the carrier chrominance signal is more out of phase with the phase-shifted 3.58 MHz continuous wave. The resulting output signal is clipped and amplified so as to obtain a desired phase width and then shaped, thereby to produce the required pulses.

Still another embodiment of the present invention is shown in FIG. 12, in which the circuits with numerals 1, 2, 3, 4 and 5 have exactly the same functions as those circuits in FIG. 1 which have the same numerals respectively. Numeral 13 shows a phase shifter for delaying the output signal of the 3.58 MHz oscillator 4 by 57° with respect to a burst signal. Numerals 14 and 15 show a Z-axis demodulator and an X-axis demodulator respectively, numeral 9 a detector for peak-detecting the output signal of the X-axis demodulator 15, and numeral 10 an adder for adding the outputs of the rectifier 5 and detector 9.

When the signals shown in FIG. 4 are applied to the bandpass amplifier 1, chrominance signals are demodulated by the X-axis demodulator 15 and Z-axis demodulator 14 respectively and color difference signals corresponding to red, green and blue are obtained through a matrix. Since the phase of the 3.58 MHz continuous wave applied to the X-axis demodulator 15 is delayed 57° with respect to a burst signal by the phase shifter 13, a carrier chrominance signal about 60° behind the burst signal is maximum in amplitude, while the one about 240° behind is minimum. That is to say, the flesh tint signal is maximum in amplitude, and according as the signal goes further away from the flesh tint signal in phase, so the amplitude of that signal becomes smaller. When the phase difference becomes ±90° or higher, a negative signal appears. Therefore, the output of the X-axis demodulator 15 is applied to the detector 9 for peak-detection, thereby to pick up only signals in the positive direction, and these signals are added in the adder 10 to a part of the output of phase detector 3 rectified by the rectifier circuit 5. The resulting output is used to control the gain of the bandpass amplifier 1. In this way, the color saturation of the flesh tint which is most often liable to be subjected to criticism is controlled at a fixed level by a signal corresponding to or near the flesh tint, in addition to an output signal of the phase detector 3 proportional to a burst signal which has been the sole signal to maintain a constant color saturation by controlling the gain of bandpass amplifier 1 in the conventional device. Also, according to the embodiment shown in FIG. 12, the demodulator can be used as a means for taking out a signal for controlling the color saturation, and therefore the circuit as a whole can be simplified, thereby achieving economy in construction.

Still another embodiment of the present invention is shown in FIG. 14, in which numerals 1, 2, 3, 4 and 5 denote exactly the same circuits as those of the same numerals shown in the conventional APC-type color synchronizing circuit of FIG. 1. Numerals 16, 17 and 18 show phase shifters for delaying the phase of the output signal of the 3.58 MHz oscillator 4 by 90°, about 300° and 180° respectively with respect to a burst signal. Numerals 19, 20 and 21 show an R–Y demodulator, G–Y demodulator and B–Y demodulator respectively. Numerals 22, 23 and 24 show an R–Y output circuit, G–Y output circuit and B–Y output circuit respectively. Numeral 25 shows a matrix which adds the output signals of the R–Y output circuit 22, G–Y output circuit 23 and B–Y output circuit 24 in the appropriate proportion. Numeral 9 shows a detector for peak-detecting the output signal of the matrix 25. Numeral 10 shows an adder for adding the outputs of the rectifier circuit 5 and detector 9.

The operation of the matrix 25 is explained below with reference to FIG. 15. The output signals of R–Y output circuit 22, G–Y output circuit 23 and B–Y output circuit 24 are delayed in phase by 90°, about 300° and 180° respectively with respect to the burst signal 26, which is shown by vectors 27, 28 and 29 in FIG. 15. Synthetizing the G–Y signal 28 and B–Y signal 29, the vector 30 is obtained, while the vector 31 results from synthetizing the vector 30 and R–Y signal 27. As can be seen from the drawing, the phase of vector 31 corresponds to the flesh tint signal which is 57° behind the burst signal 26. Incidentally, the amplitudes of color difference signals 27, 28 and 29 are determined in such a manner that the vector 31 is 57° behind the burst signal 26 in phase.

Further, explanation will be made of a color difference output circuit and matrix 25 with reference to a sample circuit shown in FIG. 16. An R–Y signal demodulated by the R–Y demodulator 19 is amplified by the transistor $Tr_7$ and applied through the capacitor $C_4$ to the red first grid of the picture tube (not shown in the drawing). On the other hand, the G–Y signal demodulated by the G–Y demodulator 20 is amplified by the transistor $Tr_8$ and applied through capacitor $C_5$ to the green first grid of the picture tube. The B–Y signal is applied to the blue first grid of the picture tube in a similar fashion. A d-c component of the color difference signal is reproduced by the clamping operation of the diodes $D_4$ and $D_5$. By adding a part of the output of the R–Y output circuit 22 and a part of the output of the G–Y output circuit 23 through resistors $R_7$ and $R_8$ respectively, the vector 34 corresponding to a flesh tint 57° behind the burst signal 26 in phase results from the synthetization of the vectors 32 and 33 as shown in FIG. 17. Here, the vector 32 shows an R–Y signal 90° behind the burst signal 26 and its amplitude is determined by the resistor $R_7$. Similarly, the vector 33 shows a G–Y signal about 300° behind the burst signal 26 and its amplitude is determined by the resistor $R_8$. The signal corresponding to the flesh tint thus obtained through the matrix 25 is peak-detected by the detector 9 as shown in FIG. 14, and this signal is added to the output signal of the rectifier circuit 5 proportional to the amplitude of the burst signal by the adder 10 thereby to control the gain of the bandpass amplifier 1.

According to the embodiment shown in FIG. 14, a signal with a large amplitude among the output signals of the color difference output circuit is used as a signal for detecting the flesh tint, and therefore not only a higher control gain but also a simpler circuit arrangement is achieved.

Still another embodiment is shown in FIG. 18, in which numerals 1, 2 and 6 show the circuits which are exactly the same as those shown by the same numerals respectively in the filter-type color synchronizing circuit of FIG. 2. Numerals 8, 10 and 35 show a phase shifter, adder and peak-detector circuit respectively. In the circuit arrangement shown above, assume that the signal applied to the bandpass amplifier 1 has a waveform as shown in FIG. 19*a* and a phase pattern as shown in FIG. 19b, continuously varying in amplitude from 30° to 330° with respect to the burst signal B. Then, the signal shown in FIG. 19, excluding the burst signal B erased by the burst erasing circuit (not shown in the drawing), appears as an output of the bandpass amplifier 1. On the other hand, 3.58 MHz continuous wave in phase with the burst signal which is obtained by the crystal filter circuit 6 is applied to the phase shifter 8 to delay the signal by 57° with respect to the burst signal. The resulting output of the phase shifter 8 and the output signal of the bandpass amplifier 1 are added by the adder 10. The output of the adder 10 thus obtained has a waveform as shown in FIG. 20, which is maximum in amplitude when the carrier chrominance signal is in phase with the output signal of the phase shifter 8 or delayed by 57° with respect to the burst signal, and minimum when the carrier chrominance signal is delayed by 180° with respect to the output signal of the phase shifter 8. Incidently, the chains A and A′ in FIG. 20 show the envelope of the output signal of the phase shifter 8.

The output signal of the adder 10 of a pattern as shown in FIG. 20 is peak-detected by the peak-rectifier 35 and then a signal corresponding to the flesh tint which is 57° behind the burst signal is detected. This signal is used as a gain control voltage for the bandpass amplifier 1 to obtain a stable saturation of the flesh tint. A substracter may be used instead of the adder 10.

As is clear from the above description, the embodiment of FIG. 18 with its simple circuit arrangement can produce a large effect since the color saturation on the picture tube can be controlled automatically even if there is a difference between the amplitude of a chrominance signal and that of a burst signal or there is some amplitude distortion in a receiver.

FIG. 21 shows another example of a means for controlling the gain of a bandpass amplifier included in the above-described embodiments. Numeral 1 shows a bandpass amplifier which consists of the first bandpass amplifier 36 and the second bandpass amplifier 37. Numerals 2, 3, 4 and 5 show exactly the same circuits of the same numerals respectively shown in FIG. 1. Numeral 38 shows a killer circuit included in the conventional color television receiving set, and numeral 39 shows a combined gate and detector circuit for picking up and detecting the carrier chrominance signal of a specified phase angle and width described earlier. The gain of the first bandpass amplifier is controlled by a d-c voltage generated by the detector circuit in proportion to the amplitude of a burst signal, and this voltage is applied to the killer circuit 38 to control the bandpass amplifier 37, thereby preventing the coloring of the picture tube when receiving a monochrome signal. On the other hand, a d-c voltage or the output of the circuit 39 corresponding to the amplitude of a carrier chrominance signal of a specified phase is applied to the second bandpass amplifier 37 to control the gain of the circuit 37. It will be understood from the above that, in the circuit arrangement shown in FIG. 21, the input of the killer circuit 38 is detected by a closed loop consisting of the components 36, 2, 3 and 5 and the magnitude of the input is determined by the amplitude of the burst signal. As a consequence, the gain of the bandpass amplifier 37 can be controlled in accordance with the amplitude of a carrier chrominance signal of a specified phase by the closed loop consisting of the components 37 to 39 without affecting the performance of the conventional color television set.

What is claimed is:

1. A color television receiver, comprising:

bandpass amplifying means for amplifying a carrier chrominance signal of a color television signal received by said receiver;

detecting means connected to the output of said bandpass amplifying means for detecting a chrominance signal having a phase representing flesh tones;

rectifying means connected to the output of said detecting means for rectifying the detected chrominance signal portion having a phase representing flesh tones; and control means connected to the output of said rectifying means for controlling the gain of said bandpass amplifying means by said rectified chrominance signal portion.

2. A color television receiver according to claim 1, further comprising:

burst gate means connected to said bandpass amplifying means for detecting a color burst signal in said chrominance signal portion; and adding means for adding the output of said rectifying means with a signal having an amplitude which is proportional to the amplitude of said burst signal, said adding means being connected to control the gain of said bandpass amplifying means by the output of said adding means.

3. A color television receiver according to claim 1, further comprising adding means for adding the output of said rectifying means to the carrier chrominance signal output from said bandpass amplifying means, wherein the output of said adding means is applied to control the gain of said bandpass amplifying means.

4. A color television receiver according to claim 1, wherein said detecting means comprises an auxiliary carrier wave generator for generating a continuous auxiliary carrier wave based on the color burst signal of said carrier chrominance signal, a plurality of chrominance demodulators for demodulating the carrier chrominance signal output of said bandpass amplifying means and a phase shifter for shifting the phase of the auxiliary carrier wave generated by said auxiliary carrier wave generator to a specified phase, wherein the phase shifted auxiliary carrier chrominance signal is applied to one of said chrominance demodulators to detect said chrominance signal portion having a phase representing flesh tones.

5. A color television receiver according to claim 4, further comprising further detecting means for detecting a burst signal from said carrier chrominance signal and adding means for adding a signal of an amplitude corresponding to the amplitude of the detected burst signal to the output of said one of said chrominance demodulators, wherein the output of said adding means is applied to control the gain of said bandpass amplifying means.

6. A color television receiver according to claim 1, wherein said detecting means comprises an auxiliary carrier wave generator for generating a continuous auxiliary carrier wave based on the color burst signal of said carrier chrominance signal, a plurality of chrominance demodulators for demodulating the carrier chrominance signal from said bandpass amplifier with said auxiliary carrier wave and a matrix circuit for composing output signals of said chrominance demodulators at a predetermined ratio.

7. A color television receiver according to claim 6, further comprising detecting means for detecting said color burst signal from said carrier chrominance signal and adding means for adding a signal of an amplitude corresponding to the amplitude of the detected burst signal to the output of said matrix circuit, wherein the output of said adding means is applied to control the gain of said bandpass amplifying means.

8. A color television receiver comprising first and second bandpass amplifiers for amplifying a carrier chrominance signal; detecting means for detecting a chrominance signal portion of the amplified carrier chrominance signal having a phase representing skin tones; rectifying means for rectifying the detected signal; further detecting means for detecting a burst signal in said carrier chrominance signal; an auxiliary carrier wave generator for generating a continuous auxiliary carrier wave based on said burst signal; a plurality of chrominance demodulators for demodulating the carrier chrominance signal from said second bandpass amplifier with said auxiliary carrier wave; a color killer circuit connected to said second bandpass amplifier; and control means for controlling the gain of said first bandpass amplifier by a direct current voltage having an amplitude corresponding to the amplitude of said burst signal, said control means also connected for operating said color killer circuit by said direct current voltage, wherein the output of said rectifying means is connected to control the gain of said second bandpass amplifier.

* * * * *